United States Patent [19]
Vohr et al.

[11] Patent Number: 5,374,129
[45] Date of Patent: Dec. 20, 1994

[54] HYDROSTATIC BEARING SUPPORT AFFORDING HIGH STATIC AND LOW DYNAMIC STIFFNESS TO A ROTOR IN TURBOMACHINERY

[75] Inventors: John H. Vohr, Schenectady, N.Y.; Bruce E. Gans, Middlesex, Mass.

[73] Assignee: General Electric Co., Schenectady, N.Y.

[21] Appl. No.: 213,785

[22] Filed: Mar. 15, 1994

[51] Int. Cl.⁵ .................... F16C 27/00; F16C 32/06
[52] U.S. Cl. ........................................ 384/99; 384/118
[58] Field of Search ............ 384/99, 100, 114, 117, 384/118, 119

[56] References Cited

U.S. PATENT DOCUMENTS 4,767,223 8/1988 Goodwin .................... 384/114
4,983,051 1/1991 Hibner et al. ................ 384/99
5,244,285 9/1993 Hagstedt et al. ............. 384/99

Primary Examiner—Thomas R. Hannon
Attorney, Agent, or Firm—Nixon & Vanderhye

[57] ABSTRACT

A hydrostatic bearing support for a rotor includes a bearing, and a mounting for the bearing affording a clearance space between the rotor and the bearing. A hydrostatic feed pocket is carried by the mounting for receiving a fluid under pressure and supplying the fluid under pressure into the clearance space to provide a fluid film between the bearing and the mounting. A pump supplies fluid under pressure to the pocket. A pressure fluctuation damper is disposed between the pump and the pocket enabling the fluid to provide a bearing support having simultaneously a low dynamic stiffness for damping rotor vibration and a high static stiffness for locating the bearing relative to mounting.

6 Claims, 4 Drawing Sheets

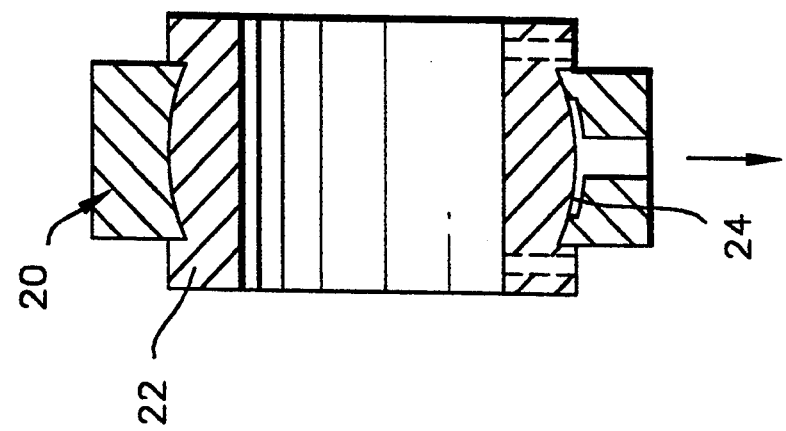
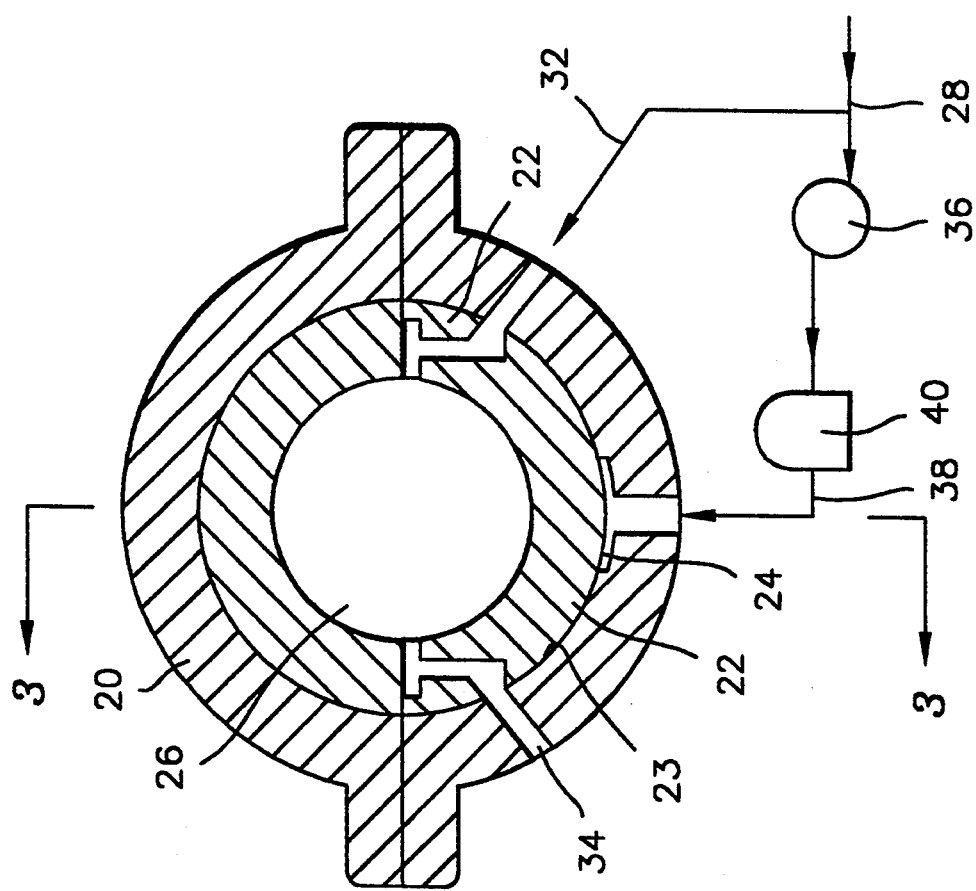

HYDROSTATIC BEARING SUPPORT AFFORDING HIGH STATIC AND LOW DYNAMIC STIFFNESS TO A ROTOR IN TURBOMACHINERY

TECHNICAL FIELD

The present invention relates to a hydrostatic support for a journal bearing within a mounting for supporting a rotor in turbomachinery and particularly relates to a hydrostatic bearing support affording high static stiffness for precisely locating the bearing within the mounting, while simultaneously affording low dynamic stiffness for optimum damping of rotor vibration.

BACKGROUND

In turbomachinery, the quest for increased efficiency often leads to rotor designs which are quite "flexible," i.e., the rotors are either slender or have a relatively long span between the bearings supporting the rotor or both. These flexible rotors tend to have natural frequencies which are lightly damped, which results in excessively large vibration amplitudes when the rotor operates near critical speeds. Also, flexible rotors tend to be more susceptible to whirl instability induced by either bearing oil film forces or aerodynamic forces.

The damping factor associated with the natural frequencies of flexible shafts can be greatly enhanced if the dynamic stiffness of the elements supporting the shaft can be reduced, while still retaining a high damping coefficient in the shaft supports. Providing a soft support for journal bearings in turbomachinery is a very effective means of increasing the damping provided to rotor vibrations and also a very effective means of stabilizing the rotor against self-excited whirl produced by bearing film forces or aerodynamic forces. Soft supports for bearings can also greatly reduce the "noise" transmitted from rotor vibrations to the rotor support base. However, it is usually necessary to retain a high static stiffness in shaft support elements to position the shaft accurately within shaft seals and to accurately control the position of turbine blades within their enclosures. Consequently, there has been a need to develop a support system for a rotor which has a high static stiffness but a low dynamic stiffness. That is, the support system should provide a high resistance to steady state displacements of the shaft and low resistance to dynamic vibrations of the shaft. Typical bearings, whether of the fluid film or rolling element type, do not provide this type of support, since their stiffness values are the same for static and dynamic motions. The only shaft support systems known to applicant which have high static stiffness combined with low dynamic stiffness are those obtained by the use of magnetic bearings. Magnetic bearings, however, have many disadvantages. They are relatively costly, require complex control systems and require redundant backup bearings in the event of power failure.

DISCLOSURE OF THE INVENTION

In accordance with the present invention, there is provided a hydrostatic bearing support which affords a very low dynamic stiffness (high damping-soft support) simultaneously with a high static stiffness (low damping-hard support). To accomplish this, the bearing support preferably includes a bearing within a mounting ring defining a clearance space between the bearing and mounting ring and wherein the mounting ring has a hydrostatic feed pocket, preferably at a six o'clock position. Preferably, a low flow constant displacement pump provides high pressure fluid, e.g., oil, to the hydrostatic feed pocket for flow in the clearance space between the bearing and mounting ring and for subsequent flow to a drain. The present invention provides a pressure fluctuation damper between the pump and the hydrostatic feed pocket which enables the hydrostatic bearing support to simultaneously provide high static stiffness (low damping-hard support) for locating the bearing and low dynamic stiffness (high damping-soft support). The pressure fluctuation damper affords a time lag in response to a change in static force applied by the rotor to the mounting ring, thereby affording and retaining static stiffness to the rotor by the supporting fluid film between the mounting ring and the bearing, while simultaneously preventing the hydrostatic support system from responding to bearing vibrations, hence affording low dynamic stiffness.

In a preferred embodiment according to the present invention, there is provided a hydrostatic bearing support for a rotor comprising a bearing, a mounting for the bearing affording a clearance space between the mounting and the bearing, a hydrostatic feed pocket carried by the mounting for receiving a fluid under pressure and supplying fluid under pressure into the clearance space thereby providing a fluid film between the bearing and the mounting, a pump for supplying fluid under pressure through a fluid supply line to the pocket and a pressure fluctuation damper disposed in the fluid supply line between the pump and the pocket enabling the fluid to provide a bearing support having simultaneously a low dynamic stiffness for damping rotor vibration and a high static stiffness for locating the bearing relative to the mounting.

In a further preferred embodiment according to the present invention, there is provided a hydrostatic bearing support for a rotor comprising a bearing, a mounting for the bearing affording a clearance space between the mounting and the bearing, a hydrostatic feed pocket disposed between the mounting and the bearing for receiving a fluid under pressure and supplying fluid under pressure into the clearance space to provide a fluid film between the bearing and the mounting, a pump for supplying fluid under pressure via a supply line to the pocket and means disposed in the fluid supply line between the pump and the pocket for providing simultaneously in the bearing support a low dynamic stiffness for damping rotor vibration and a high static stiffness for locating the bearing relative to the mounting.

Accordingly, it is a primary object of the present invention to provide a hydrostatic bearing support for a rotor for simultaneously providing high static and low dynamic stiffness and in a simple, robust manner, necessitating very little hardware modification in existing rotating machinery.

BRIEF DESCRIPTION OF THE DRAWINGS

FIG. 2 is a schematic cross-sectional view through a bearing and mounting ring illustrating the hydrostatic bearing support of the present invention;

FIG. 3 is a cross-sectional view taken generally about on line 3—3 in FIG. 2;

BEST MODE FOR CARRYING OUT THE INVENTION

Figure 1:
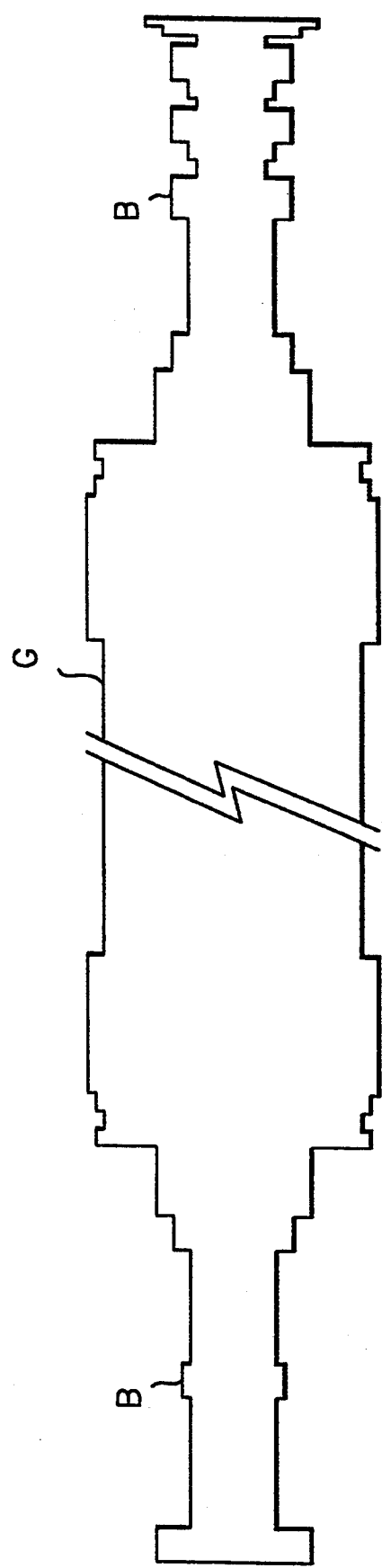
FIG. 1 is a schematic side elevational view of rotating turbomachinery in which the hydrostatic bearing support system of the present invention may be employed.

Referring to FIG. 1, there is schematically illustrated a generator G having a rotor mounted at its opposite ends in bearings B. It will be appreciated that in any such rotatable machinery such as a turbine or a generator attached to the turbine, rotor vibrations occur from a number of different sources. The hydrostatic bearing support of the present invention is applicable to bearings for both a turbine and generator in o turbomachinery, as well as in other machinery having rotary parts where vibrations are a problem.

Referring now to FIGS. 2 and 3, there is illustrated a mount 20, e.g., a mounting ring, for a bearing 22. As will be appreciated, there is a clearance space 23 between the bearing 22 and mounting ring 20, for example, on the order of 0.003–0.004 inches. Additionally, mounting ring 20 has a hydrostatic feed pocket 24 for receiving fluid under pressure affording static lift to rotor 26 disposed within bearing 22, as well as for circulating the fluid into the clearance space 23 between the bearing and mounting ring, affording high damping and low dynamic stiffness to the bearing support, as explained hereafter. Additionally, in FIG. 1, there is illustrated a fluid, preferably oil, feed line 28 for supplying fluid to the interior of the bearing surfaces for lubricating the rotor journal. The lubricant is supplied via a feed line 32 and passages in the bearing 22. A lubricant drain 34 is also provided the bearing and mounting ring for draining lubricant from the bearing.

In fluid feed line 28 downstream of feed line 32, there is provided a low flow constant displacement pump 36, for example, a screw pump, for supplying fluid under pressure via a fluid line 38 to the hydrostatic feed pocket 24 and the clearance 23 between bearing 22 and mounting ring 20. Disposed between the pump 36 and the hydrostatic feed pocket 24 is a pressure fluctuation damper 40. It will therefore be appreciated that fluid is supplied by the pump 36 to the hydrostatic feed pocket 24 and the clearance space 23 such that the injected high pressure fluid can provide a hydrostatic supporting lift to the bearing within the mounting ring. The fluid supplied the pocket 24 and clearance 23 can be drained back into the drain lines from the bearing or squeezed out axially on opposite sides of the mounting ring, as illustrated in FIG. 3. The sides of the ball seat of the mounting ring 20 can be sealed by conventional means such as piston rings to reduce the flow rate of the fluid through the system.

Figure 4:
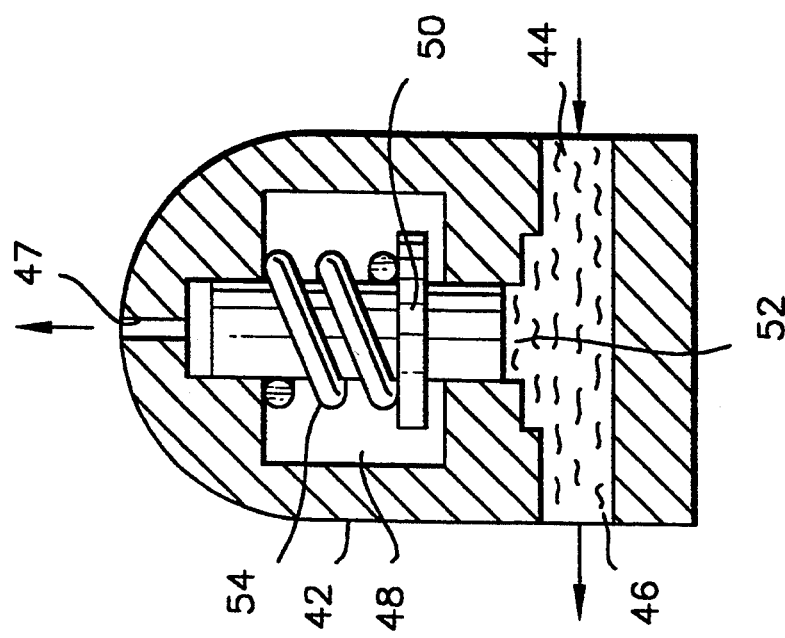

In accordance with the present invention, the static stiffness of the hydrostatic support fluid film is retained while affording a very low dynamic stiffness by means of a pressure fluctuation damper 40. Referring now to FIG. 4, the pressure fluctuation damper is disposed in the fluid supply line 38 to the pocket 24 and comprises a housing 42 having an inlet 44, an outlet 46 and a chamber 48 slidably receiving a piston 50. The end face 52 of the piston is in communication with the fluid flowing from the inlet to the outlet. Piston 50 is also biased by a spring 54 for movement toward the fluid flow between inlet 44 and outlet 46. A vent 47 connected to a drain is provided through a top portion of housing 42.

Figure 5:
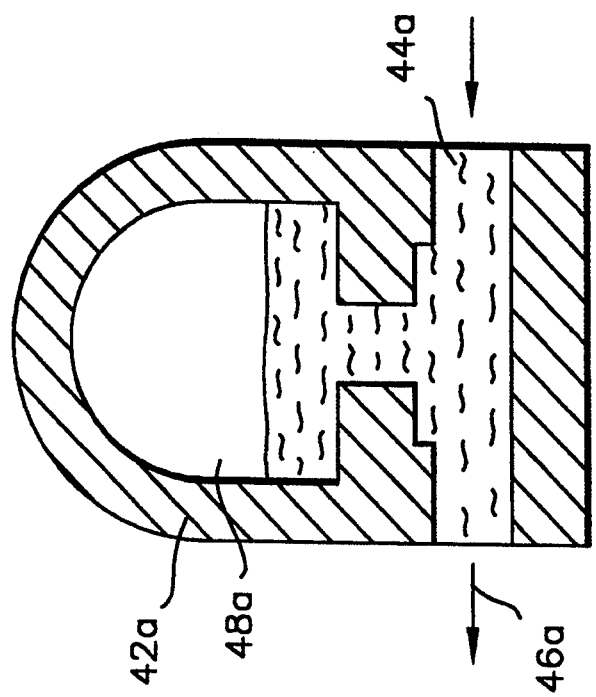
FIGS. 4 and 5 are enlarged cross-sectional views of two forms of a pressure fluctuation damper according to the present invention.

In a second embodiment of a pressure fluctuation damper illustrated in FIG. 5, there is provided a housing 42a having a fluid inlet 44a and a fluid outlet 46a and a chamber 48a. Chamber 48a is closed at its upper end rather than vented as in the preceding embodiment, with the air in the chamber 48a serving as a spring for the fluid within the chamber.

Without the pressure fluctuation damper in the fluid supply line, any increase in downward displacement of the bearing due to a change in static loading would result in an almost instantaneous increase in pressure in the feed pocket 24 to maintain the same flow through the film between the bearing and mounting ring. For example, a downward displacement of the rotor, and hence the bearing, toward the pocket 24 will reduce the thickness of the hydrostatic film in the clearance 23 and the resistance to fluid flow will greatly increase. Because the flow to the film is provided by a constant volume pump, an increase in pressure occurs instantaneously in the pocket 24 and hence increase the stiffness of the supporting film. Thus, pocket pressure would respond immediately to bearing vibrations and the dynamic stiffness of the hydrostatic film would be the same as the static stiffness.

However, with the pressure fluctuation damper in the fluid supply line between the constant flow pump and the hydrostatic feed pocket, the pressure in the feed pocket will be substantially equal to that in the damper. Note, however, that the damper pressure is controlled by the pressure exerted by the spring-biased piston in the damper. For this pressure to change, it is necessary, for example, to force the piston upwardly as illustrated in FIG. 4, further compressing the spring against which it is mounted. The piston can only be forced upward, however, when the flow coming into the damper is greater than the flow exiting the damper. Since it requires a time interval for flow to move the piston, the pressure response to a reduction in flow from the damper will be delayed.

If the vibration of the bearing in the damper film is relatively rapid, the pressure in the damper and, hence, in the hydrostatic feed pocket will not respond to bearing vibrations. As a consequence, the hydrostatic support system will have a low dynamic stiffness, while retaining a high static stiffness. The level of dynamic stiffness can be readily adjusted by varying the piston area and spring stiffness in the pressure fluctuation damper.

In the embodiment of the damper illustrated in FIG. 5, the volume of the gas within the chamber 48a serves as the spring against which the pressure acts. The operation of the FIG. 5 embodiment is very similar to that of FIG. 4, with the substitution of an air volume serving as a spring, as opposed to a spring-biased piston, as in FIG. 4.

This phenomena is a result of two distinct sources of pressure acting on the bearing. There is a pressure in the hydrostatic feed pocket 24, as well as the clearance space 23 between the bearing and the mounting ring. This pressure peaks in the pocket and decreases through the clearance film from the pocket to the boundaries of the film at the opposite axial ends of the bearing and mounting ring interface. This pressure is in phase with the displacement of the bearing if the bearing is displaced slowly. Consequently, it constitutes a spring stiffness pressure proportional to the displacement of the bearing and, hence, affords a static stiffness to the system.

The second pressure is that which is a result of oil squeezed in the clearance space 23. Instead of being proportional to displacement, this pressure is proportional to the velocity of the squeezing action and is out-of-phase with displacement. If there is a displacement but little or no velocity, e.g., toward the end of a downward displacement of the rotor, this squeeze film pressure tends toward zero. Halfway between minimum and maximum displacements, there will be a maximum velocity, hence affording a maximum squeeze film pressure. When the bearing is vibrating rapidly, the fluid is alternately squeezed and relieved in the clearance space at relative high frequency, but the static pressure in the hydrostatic feed pocket may not vary, although the squeeze film pressure changes proportional to velocity. As indicated earlier, at the end of each displacement during vibration, the squeeze film pressure tends toward zero and there is no increase in pressure in the feed pocket. Hence, there is no increase in stiffness in a dynamic sense at either end of the amplitude of vibration. Consequently, the squeeze film pressure is a damping pressure responsive only to velocity, while the stiffness pressure responds to displacement. That is, the fluid film in the clearance space develops squeezing pressure in response to velocities of movement of the bearing but will not develop stiffness pressure due to displacement because, with rapid vibration, the pressure fluctuation damper prevents a change in pressure in the hydrostatic feed pocket 24. The vibration is so rapid that pressure in the feed pocket 24 will not rise by the time the velocity stroke reverses and the squeeze film pressure decreases resulting in a bearing support having low dynamic stiffness (high damping-soft support). Conversely, if the bearing is displaced relatively slowly, static pressure will build up in the feed pocket due to the static spring effect of the fluctuation pressure damper resulting in high static stiffness (low damping-hard support).

Figure 7:
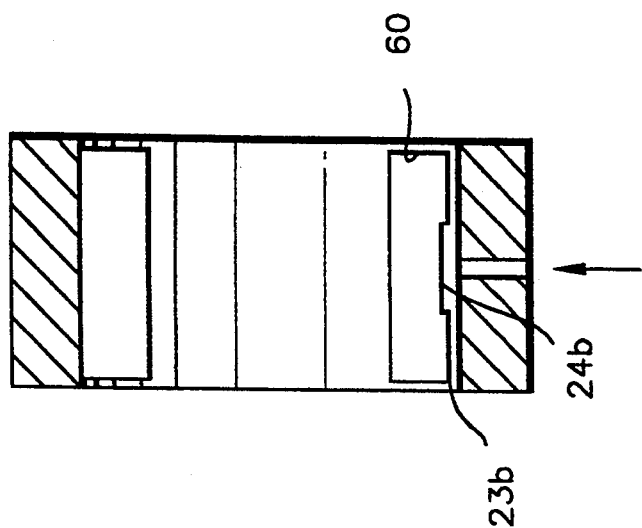
FIG. 7 is a cross-sectional view thereof taken generally about on line 7—7 in FIG. 6.
Figure 6:
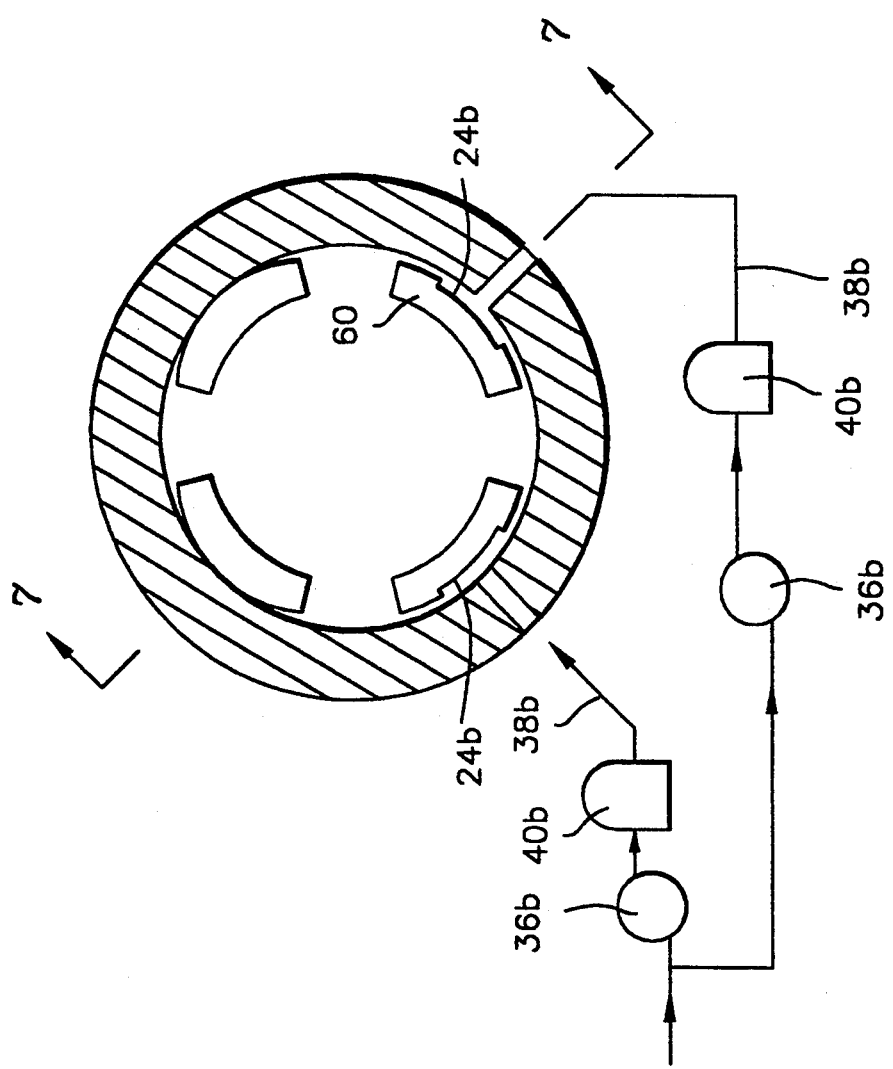
FIG. 6 is a view similar to FIG. 2 illustrating application of the present hydrostatic bearing support to standard hydrostatically supported tilt bearing pads.

Referring to FIGS. 6 and 7, the hydrostatic support hereof is used also to directly support the load bearing pads 60 of a tilting pad bearing. Thus, fluid under pressure is supplied the feed pocket 24b of each tilt bearing pad 60 via discrete fluid supply lines 38b, low flow constant displacement pumps 36b and pressure fluctuation dampers 40b. Thus, the mount carries upper standard tilt pads 62 and lower hydrostatically supported tilt pads 60, each provided with a feed pocket 24b and a clearance space 23b. The high static and low dynamic stiffness characteristics of the previously described hydrostatic bearing support for the embodiment hereof illustrated in FIGS. 2 and 3 are also applicable to the tilt pad of FIGS. 6 and 7.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A hydrostatic bearing support for a rotor comprising:
   a bearing;
   a mounting for the bearing affording a clearance space between the mounting and the bearing;
   a hydrostatic feed pocket carried by said mounting for receiving a fluid under pressure and supplying fluid under pressure into the clearance space thereby providing a fluid film between said bearing and said mounting;
   a pump for supplying fluid under pressure through a fluid supply line to said pocket; and
   a pressure fluctuation damper disposed in said fluid supply line between said pump and said pocket enabling the fluid to provide a bearing support having simultaneously a low dynamic stiffness for damping rotor vibration and a high static stiffness for locating the bearing relative to the mounting.

2. A bearing support according to claim 1 wherein said pressure fluctuation damper includes a housing having a fluid inlet for receiving fluid under pressure from said pump, an outlet for supplying fluid under pressure received from said inlet to said pocket and means carried by said housing responsive to changes in static pressure in said feed pocket for equalizing over time the feed pocket fluid pressure and the fluid pressure in said damper to afford the static stiffness to the bearing support.

3. A bearing support according to claim 2 wherein said damper includes a piston in said housing and a spring for biasing said piston in a direction applying pressure to the fluid under pressure in said housing.

4. A bearing support according to claim 2 wherein said damper includes a closed chamber in said housing defining a volume of air in communication with the pressure fluid in said housing for applying an equal and opposite air pressure to the fluid under pressure in response to changes in the pressure of the fluid in said housing.

5. A bearing support according to claim 1 wherein said bearing comprises a hydrostatically supported tilt pad.

6. A hydrostatic bearing support for a rotor comprising:
   a bearing;
   a mounting for the bearing affording a clearance space between the mounting and the bearing;
   a hydrostatic feed pocket disposed between said mounting and said bearing for receiving a fluid under pressure and supplying fluid under pressure into the clearance space to provide a fluid film between said bearing and said mounting;
   a pump for supplying fluid under pressure via a supply line to said pocket; and
   means disposed in said fluid supply line between said pump and said pocket for providing simultaneously in said bearing support a low dynamic stiffness for damping rotor vibration and a high static stiffness for locating the bearing relative to the mounting.

* * * * *